US010880383B2

(12) United States Patent
Qi et al.

(10) Patent No.: US 10,880,383 B2
(45) Date of Patent: Dec. 29, 2020

(54) METHODS AND DEVICES FOR ESTABLISHING COMMUNICATION BETWEEN NODES IN BLOCKCHAIN SYSTEM

(71) Applicant: Advanced New Technologies Co., Ltd., Grand Cayman (KY)

(72) Inventors: Yitong Qi, Zhejiang (CN); Jiang Wang, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/773,441

(22) Filed: Jan. 27, 2020

(65) Prior Publication Data
US 2020/0252465 A1    Aug. 6, 2020

Related U.S. Application Data

(63) Continuation of application No. PCT/CN2019/074436, filed on Feb. 1, 2019.

(51) Int. Cl.
*H04L 29/08* (2006.01)
*H04L 9/32* (2006.01)
*H04L 29/06* (2006.01)

(52) U.S. Cl.
CPC .......... *H04L 67/141* (2013.01); *H04L 9/3239* (2013.01); *H04L 67/143* (2013.01); *H04L 69/16* (2013.01)

(58) Field of Classification Search
CPC . H04L 67/141; H04L 9/3239; H04L 2209/38; H04L 67/143; H04L 69/16
See application file for complete search history.

(56) References Cited

U.S. PATENT DOCUMENTS 10,084,699 B2 *  9/2018  Burgess ................. H04L 69/14
2011/0078312 A1   3/2011  Rimac et al.
(Continued)

FOREIGN PATENT DOCUMENTS

| CN | 102771178 A  | 11/2012 |
| CN | 105960778 A  | 9/2016  |
| KR | 20100087213 A | 8/2010 |

OTHER PUBLICATIONS

Written Opinion of the International Searching Authority of PCT Application No. PCT/CN2019/074436, dated Oct. 8, 2019, issued by the ISA/CN—National Intellectual Property Administration, PRC, China.

(Continued)

*Primary Examiner* — Trang T Doan
(74) *Attorney, Agent, or Firm* — Finnegan, Henderson, Farabow, Garrett & Dunner, L.L.P.

(57) ABSTRACT

Disclosed herein are methods, devices, and apparatuses, including computer programs stored on computer-readable media, for establishing communication between a first node and a second node in a blockchain system. One of the methods includes: the first node providing a node identifier of the first node to the second node and receiving a node identifier of the second node from the second node, to cause a first communication session to be established between the first node and the second node; the first node determining whether a second communication session exists between the first node and the second node; and in response to a determination that the second communication session exists between the first node and the second node, terminating one of the first communication session and the second communication session based on the node identifier of the first node and the node identifier of the second node.

15 Claims, 6 Drawing Sheets

(56) References Cited

U.S. PATENT DOCUMENTS

| | | |
|---|---|---|
| 2016/0352597 A1 | 12/2016 | Mekkattuparamban et al. |
| 2016/0381722 A1 | 12/2016 | Konji |
| 2018/0070393 A1* | 3/2018 | Serravalle ............... H04W 8/26 |
| 2020/0028775 A1* | 1/2020 | Chen ....................... H04L 45/20 |
| 2020/0128595 A1* | 4/2020 | Dees ..................... H04W 76/14 |

OTHER PUBLICATIONS

International Search Report of PCT Application No. PCT/CN2019/074436, dated Oct. 8, 2019, issued by the ISA/CN—National Intellectual Property Administration, PRC, China.
Extended European Search Report for Application No. 19717100.2, dated Apr. 28, 2020.
Notice of Preliminary Rejection for Korean Application No. 10-2019-7019262, dated Sep. 22, 2020.

* cited by examiner

METHODS AND DEVICES FOR ESTABLISHING COMMUNICATION BETWEEN NODES IN BLOCKCHAIN SYSTEM

CROSS REFERENCE TO RELATED APPLICATIONS

This application is a continuation of International Application No. PCT/CN2019/074436, filed Feb. 1, 2019, the entire content of which is incorporated herein by reference.

TECHNICAL FIELD

The specification relates generally to computer technologies, and more particularly, to methods and devices for establishing communication between nodes in a blockchain system.

BACKGROUND

Blockchain systems, also known as distributed ledger systems (DLSs) or consensus systems, may enable participating entities to store data securely and immutably. Blockchain systems may include any DLSs, without referencing any particular use case, and may be used for public, private, and consortium blockchain networks. A public blockchain network is open for all entities to use the system and participate in the consensus process. A private blockchain network is provided for a particular entity, which centrally controls read and write permissions. A consortium blockchain network is provided for a select group of entities, which control the consensus process, and includes an access control layer.

A blockchain system maintains one or more blockchains. A blockchain is a data structure for storing data, such as transactions, that may prevent tampering and manipulation of the data by malicious parties.

A blockchain system is implemented using a peer-to-peer (P2P) network, in which the nodes communicate directly with each other, e.g., without the need of a fixed, central server. Each node in the P2P network may initiate communication with another node in the P2P network.

In one such system, two nodes, Node A and Node B, in the P2P network may both send connection requests to each other to initiate a communication. If both connection requests are processed, the resulting network will contain two redundant connections established between Node A and Node B. In another such system, only the node with a larger node identifier between two nodes is allowed to send a connection request. If the node with a smaller node identifier is not allowed to accept any connection request, e.g., for security reasons, no communication may be established between the two nodes.

SUMMARY

In one aspect, a computer-implemented method for establishing communication between a first node and a second node in a blockchain system includes: providing, by the first node, a node identifier of the first node to the second node and receiving, by the first node, a node identifier of the second node from the second node, to cause a first communication session to be established between the first node and the second node; determining, by the first node, whether a second communication session exists between the first node and the second node; and in response to a determination that the second communication session exists between the first node and the second node, terminating, by the first node, one of the first communication session and the second communication session based on the node identifier of the first node and the node identifier of the second node.

In another aspect, a computing device for implementing a first node in a blockchain system includes: one or more processors; and one or more computer-readable memories coupled to the one or more processors and having instructions stored thereon. The instructions are executable by the one or more processors to: provide a node identifier of the first node to a second node in the blockchain system and receive a node identifier of the second node from the second node, to cause a first communication session to be established between the first node and the second node; determine whether a second communication session exists between the first node and the second node; and in response to a determination that the second communication session exists between the first node and the second node, terminate one of the first communication session and the second communication session based on the node identifier of the first node and the node identifier of the second node.

In still another aspect, a non-transitory computer-readable medium has stored therein instructions that, when executed by a processor of a computing device, cause the computing device to perform a method for establishing communication between a first node and a second node in a blockchain system. The method includes: providing, by the first node, a node identifier of the first node to the second node and receiving, by the first node, a node identifier of the second node from the second node, to cause a first communication session to be established between the first node and the second node; determining, by the first node, whether a second communication session exists between the first node and the second node; and in response to a determination that the second communication session exists between the first node and the second node, terminating, by the first node, one of the first communication session and the second communication session based on the node identifier of the first node and the node identifier of the second node.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Figure 1:
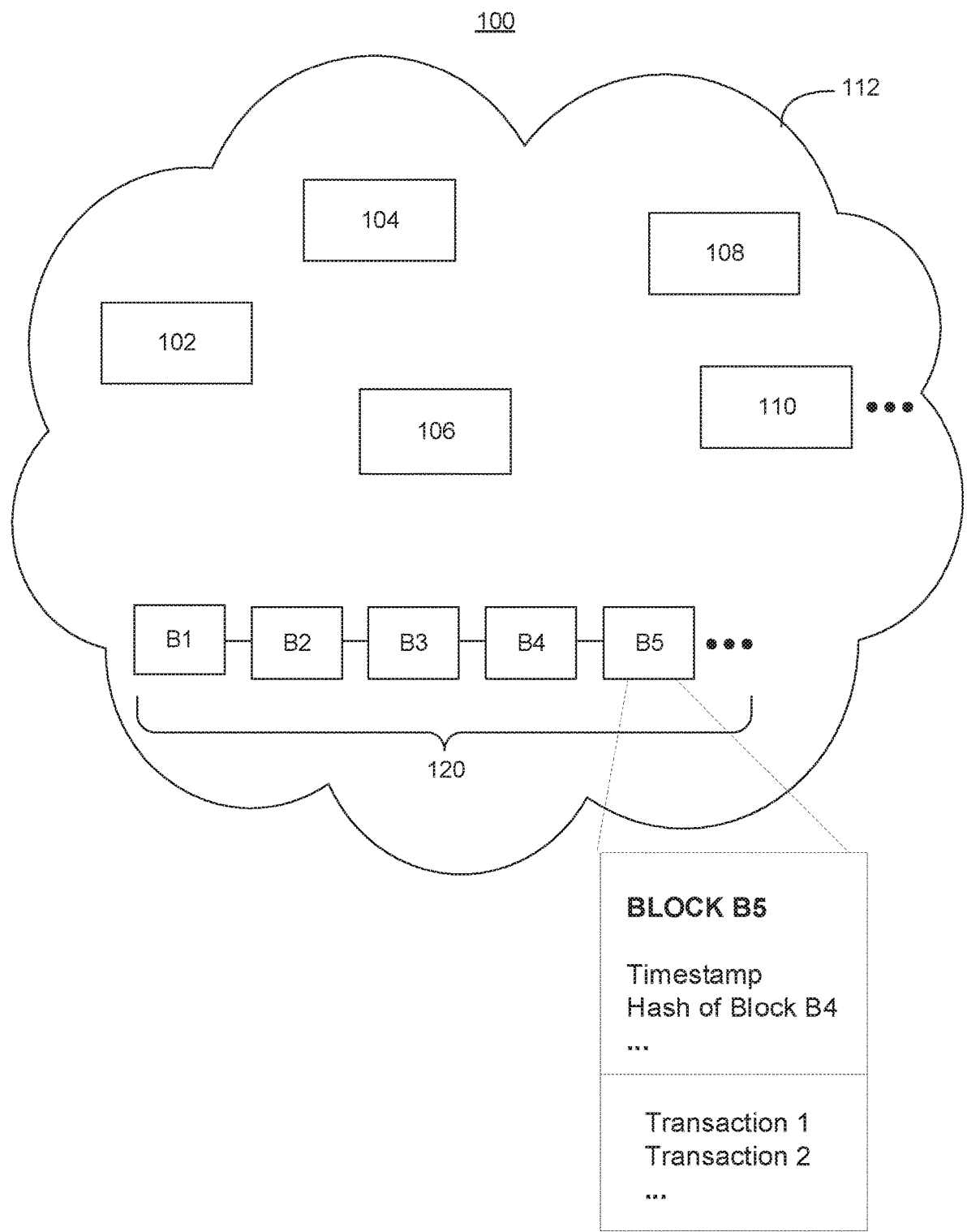
FIG. 1 is a schematic diagram of a blockchain system, according to an embodiment.

Embodiments of the specification provide methods and devices for establishing communication between a first node and a second node in a blockchain system. The methods and devices allow each of the first node and the second node to send a connection request to establish a communication session between the first node and the second node. The methods and devices then check whether more than one communication session has been established between the first node and the second node and, if so, can terminate the extra communication session and the connection on which the extra communication session is established based on node identifiers of the first and second nodes.

Embodiments disclosed in the specification have one or more technical effects. In some embodiments, the methods and devices provide every node in a blockchain system with the ability to request for connections. This allows for more flexibility and prevents starvation that may occur under certain conditions, e.g., when a node fails to satisfy a certain preestablished rule, thereby being prevented from requesting for a connection with another node. In other embodiments, the methods and devices provide the abilities to check whether more than one communication session has been established between a given pair of nodes in a blockchain system. This allows the blockchain system to avoid establishing redundant connections between the nodes, thereby saving computation resources and, at the same time, facilitating communication between the nodes in a secure environment. In still other embodiments, such a secure environment satisfies certain requirements, e.g., where certain nodes are only allowed to request for connections and are required to reject all received connection requests for security reasons. In yet other embodiments, the methods and devices provide the abilities to identify nodes in a blockchain system without using their IP addresses. This allows each IP address to be used to support more than one node, thereby improving system flexibility. Practically, allowing an IP address to support more than one node enables one computing device to host more than one node, thereby reducing the hardware cost for implementing the blockchain system.

The following description provides details of embodiments. In the embodiments, a blockchain is a data structure that stores data, e.g., transactions, in a way that the transactions may be immutable and subsequently verified. A blockchain includes one or more blocks. Each block is linked to a previous block immediately before it in the blockchain by including a cryptographic hash of the previous block. Each block also may include a timestamp, its own cryptographic hash, and one or more transactions. The transactions, which generally have already been verified by the nodes of the blockchain system, may be hashed and encoded into a data structure, such as a Merkle tree. In a Merkle tree, data at leaf nodes of the tree is hashed, and all hashes in each branch of the tree may be concatenated at a root of the branch. This process continues up the tree to the root of the entire tree, which stores a hash that is representative of all data in the tree. A hash purporting to be of a transaction stored in the tree can be quickly verified by determining whether it is consistent with the structure of the tree.

A blockchain system includes a network of computing nodes that manage, update, and maintain one or more blockchains. The network may be a public blockchain network, a private blockchain network, or a consortium blockchain network. For example, numerous entities, such as hundreds, thousands, or even millions of entities, can operate in a public blockchain network, and each of the entities operates at least one node in the public blockchain network. Accordingly, the public blockchain network can be considered a public network with respect to the participating entities. Sometimes, a majority of entities (nodes) must sign every block for the block to be valid and added to the blockchain of the blockchain network. Examples of public blockchain networks include particular peer-to-peer payment networks that leverage a distributed ledger, referred to as blockchain.

In general, a public blockchain network may support public transactions. A public transaction is shared with all of the nodes in the public blockchain network, and is stored in a global blockchain. A global blockchain is a blockchain replicated across all nodes, and all nodes are in perfect state consensus with respect to the global blockchain. To achieve consensus (e.g., agreement to the addition of a block to a blockchain), a consensus protocol is implemented in the public blockchain network. Examples of consensus protocols include proof-of-work (POW) (e.g., implemented in the some crypto-currency networks), proof-of-stake (POS), and proof-of-authority (POA).

In general, a private blockchain network may be provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions), Various types of access control mechanisms can be used (e.g., existing participants vote on adding new entities, a regulatory authority can control admission).

In general, a consortium blockchain network may be private among the participating entities. In a consortium blockchain network, the consensus process is controlled by an authorized set of nodes, one or more nodes being operated by a respective entity (e.g., a financial institution, insurance company), For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

FIG. 1 illustrates a schematic diagram of a blockchain system 100, according to an embodiment. Referring to FIG. 1, the blockchain system 100 may include a plurality of nodes, e.g., nodes 102-110, configured to operate on a blockchain 120. The nodes 102-110 may form a network 112, such as a peer-to-peer (P2P) network. Each of the nodes 102-110 may be a computing device, such as a computer or a computer system, configured to store a copy of the blockchain 120, or may be software running on the computing device, such as a process or an application. Each of the nodes 102-110 may have a unique identifier.

The blockchain 120 may include a growing list of records in the form of data blocks, such as blocks B1-B5 in FIG. 1. Each of the blocks B1-B5 may include a timestamp, a cryptographic hash of a previous block, and data of the present block, which may be transactions such as monetary transactions. For example, as illustrated in FIG. 1, block B5 may include a timestamp, a cryptographic hash of block B4, and transaction data of block B5. Also, for example, a hashing operation may be performed on the previous block to generate the cryptographic hash of the previous block.

The hashing operation may convert inputs of various lengths into cryptographic outputs of a fixed length through a hash algorithm, such as SHA-256.

The nodes 102-110 may be configured to perform an operation on the blockchain 120. For example, when a node, e.g., the node 102, wants to store new data onto the blockchain 120, that node may generate a new block to be added to the blockchain 120 and broadcast the new block to other nodes, e.g., the nodes 104-110, in the network 112. Based on legitimacy of the new block, e.g., validity of its signature and transactions, the other nodes may determine to accept the new block, such that the node 102 and the other nodes may add the new block to their respective copies of the blockchain 120. As this process repeats, more and more blocks of data may be added to the blockchain 120.

Figure 2:
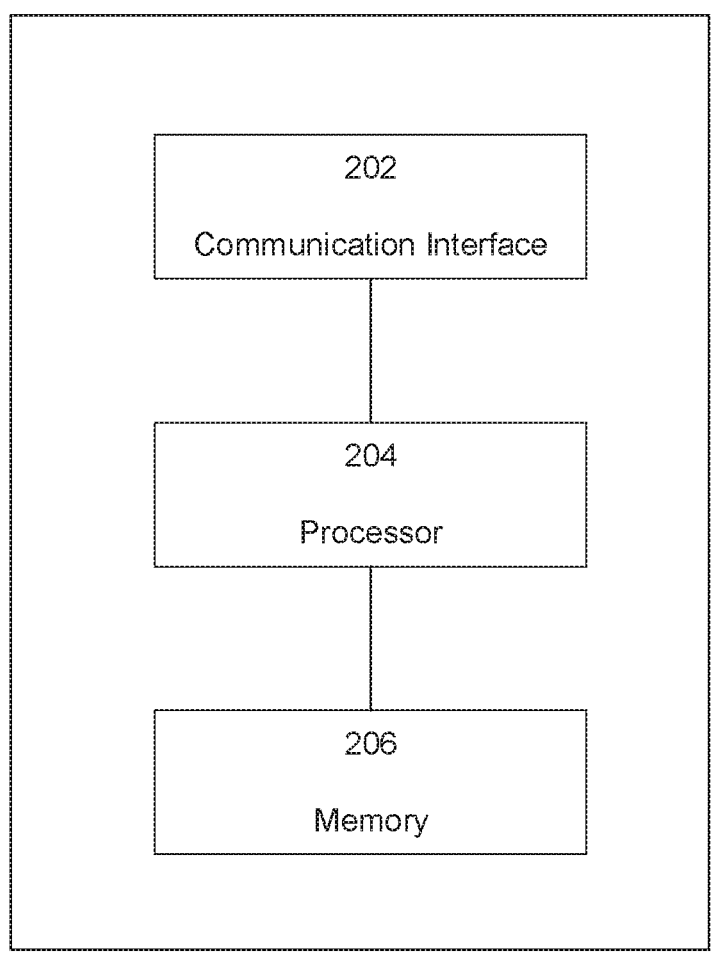
FIG. 2 is a schematic diagram of a computing device for implementing a node in a blockchain system, according to an embodiment.

FIG. 2 illustrates a schematic diagram of a computing device 200 for implementing a node, e.g., the node 102 (FIG. 1), in a blockchain system, according to an embodiment. Referring to FIG. 2, the computing device 200 may include a communication interface 202, a processor 204, and a memory 206.

The communication interface 202 may facilitate communications between the computing device 200 and devices implementing other nodes, e.g., nodes 104-110 (FIG. 1), in the network. In some embodiments, the communication interface 202 is configured to support one or more communication standards, such as an Internet standard or protocol, an Integrated Services Digital Network (ISDN) standard, etc. In some embodiments, the communication interface 202 may include one or more of a Local Area Network (LAN) card, a cable modem, a satellite modem, a data bus, a cable, a wireless communication channel, a radio-based communication channel, a cellular communication channel, an Internet Protocol (IP) based communication device, or other communication devices for wired and/or wireless communications. In some embodiments, the communication interface 202 may be based on public cloud infrastructure, private cloud infrastructure, hybrid public/private cloud infrastructure.

The processor 204 may include one or more dedicated processing units, application-specific integrated circuits (ASICs), field-programmable gate arrays (FPGAs), or various other types of processors or processing units. The processor 204 is coupled with the memory 206 and is configured to execute instructions stored in the memory 206.

The memory 206 may be configured to store processor-executable instructions and data, such as a copy of the blockchain 120 (FIG. 1). The memory 206 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in the memory 206 are executed by the processor 204, the computing device 200 may perform an operation on the blockchain 120.

To facilitate operation of the blockchain system 100 (FIG. 1 the nodes 102-110 in the network 112 may operate according to an inter-node communication method. This inter-node communication method may specify a process for establishing communication between first and second nodes in the network so that redundant connections between the two nodes can be avoided.

For example, the nodes 102 and 104 may verify whether a connection has already been established, e.g., based on their corresponding IP addresses, before sending out a connection request. Additionally, upon receiving a connection request, the receiving node may verify whether a connection has already been established. The receiving node may reject the connection request if it determines that a connection has already been established, effectively avoiding redundant connections.

Figure 3:
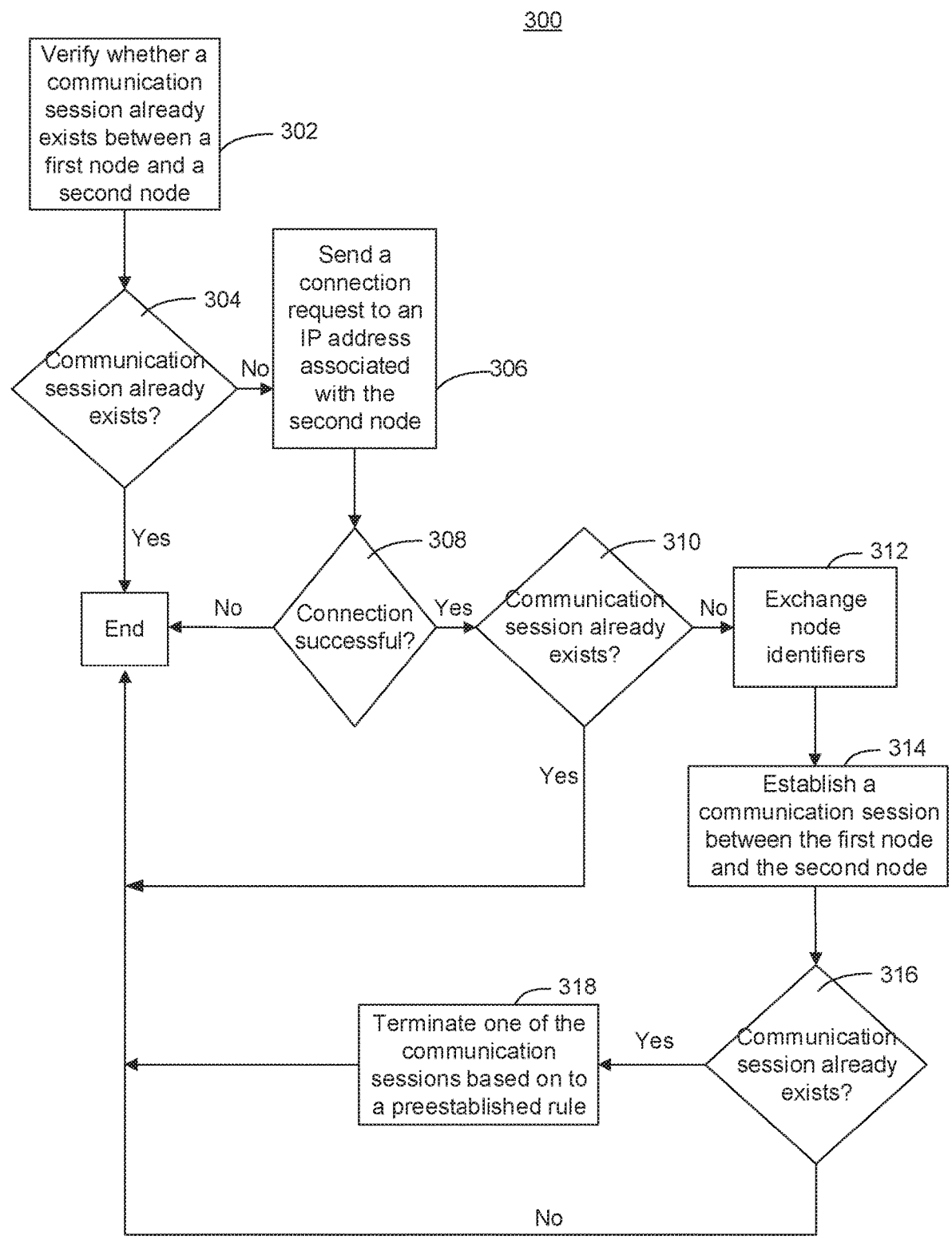
FIG. 3 is a flow chart of a method for establishing communication between first and second nodes in a blockchain system, according an embodiment.

FIG. 3 illustrates a flow chart of a method 300 for establishing communication between first and second nodes in a blockchain system, according to an embodiment. For example, the blockchain system may be implemented as a P2P network including a plurality of nodes. Also, for example, the method 300 may be performed by the node 102 (FIG. 1) as the first node to initiate communication with the node 104 (FIG. 1) as the second node.

Referring to FIGS. 1 and 3, at step 302, the node 102 may verify whether a prior communication session already exists or has been established between the node 102 and the node 104. For example, a communication session may be a temporary and interactive information interchange between the node 102 and the node 104. Depending on specific implementations, the communication session may be established in an application layer or a session layer. In some embodiments, the node 102 may use a node identifier of the node 104 to verify whether a communication session already exists between the node 102 and the node 104.

At step 304, if the node 102 determines that a prior communication session already exists between the node 102 and the node 104, the node 102 may terminate execution of the method 300. On the other hand, if the node 102 determines that no prior communication session exists between the node 102 and the node 104, the node 102 may, at step 306, send a connection request to an IP address associated with the node 104. For example, the connection request is configured to establish a physical communication channel between the node 102 and the node 104. In some embodiments, the node 102 may request to connect with the node 104 at a transport layer level, e.g., request to establish a Transmission Control Protocol (TCP) connection with the node 104. In some embodiments, the node 102 may carry out step 306 by establishing the TCP connection without creating a communication session with the node 104.

At step 308, the node 102 may determine whether a connection with the node 104 is successful. If not, e.g., due to the connection request being rejected by the node 104, the node 102 may terminate the execution of the method 300. On the other hand, if the node 102 determines that the connection is successful, the node 102 may, at step 310, further determine whether a communication session exists between the node 102 and the node 104. For example, when the node 102 requests to connect with the node 104, the node 104 may also request to connect with the node 102 and establish a communication session with the node 102. If the node 102 determines that a communication session exists between the node 102 and the node 104 at step 310, the node 102 may terminate the execution of method 300. If not, the node 102 may proceed to step 312.

At step 312, the node 102 may exchange node identifiers with the node 104 by providing a node identifier of the node 102 to the node 104 and receiving a node identifier of the node 104 from the node 104. In some embodiments, the node 102 and the node 104 may each sign the exchange using their private keys for security reasons. For example, the node 102 may encrypt its node identifier using a private key of the node 102, and the node 104 may encrypt its node identifier using a private key of the node 104. In some embodiments, however, signing the exchange using private keys may not be necessary, such as when the nodes 102 and 104 are operating in a secured environment, e.g., an isolated testing environment. It is to be understood that while specific implementations may vary, the purpose of this exchange is the same, which is to facilitate exchange of node identifiers in order to cause a communication session to be established on top of the connection between the node 102 and the node 104, at step 314.

At step 316, the node 102 may determine whether another communication session, e.g., a prior communication session different from the communication session just established in step 314, already exists between the node 102 and the node 104. For example, when the node 102 exchanges node identifiers with the node 104, the node 104 may also establish a communication session with the node 102. If the node 102 determines that no other communication session exists between the node 102 and the node 104, the node 102 may terminate the execution of method 300. On the other hand, if the node 102 determines that another communication session already exists between the node 102 and the node 104, the node 102 may proceed to step 318 in order to terminate one of the communication sessions based on a preestablished rule. The node 102 may also terminate the connection between the node 102 and the node 104 on which the terminated communication session was established.

The preestablished rule may be based on node identifiers. For example, the node 102 may select for termination the communication session that was initiated by the node with a larger (or smaller) node identifier. The preestablished rule may also be based on other factors as long as the factors used are capable of systematically distinguishing the communication sessions, so that one communication session is allowed to remain and all other communication sessions can be identified and terminated. For example, the preestablished rule may require the node 102 to terminate all previously established communication sessions and keep the communication session that was established most recently.

Figure 4:
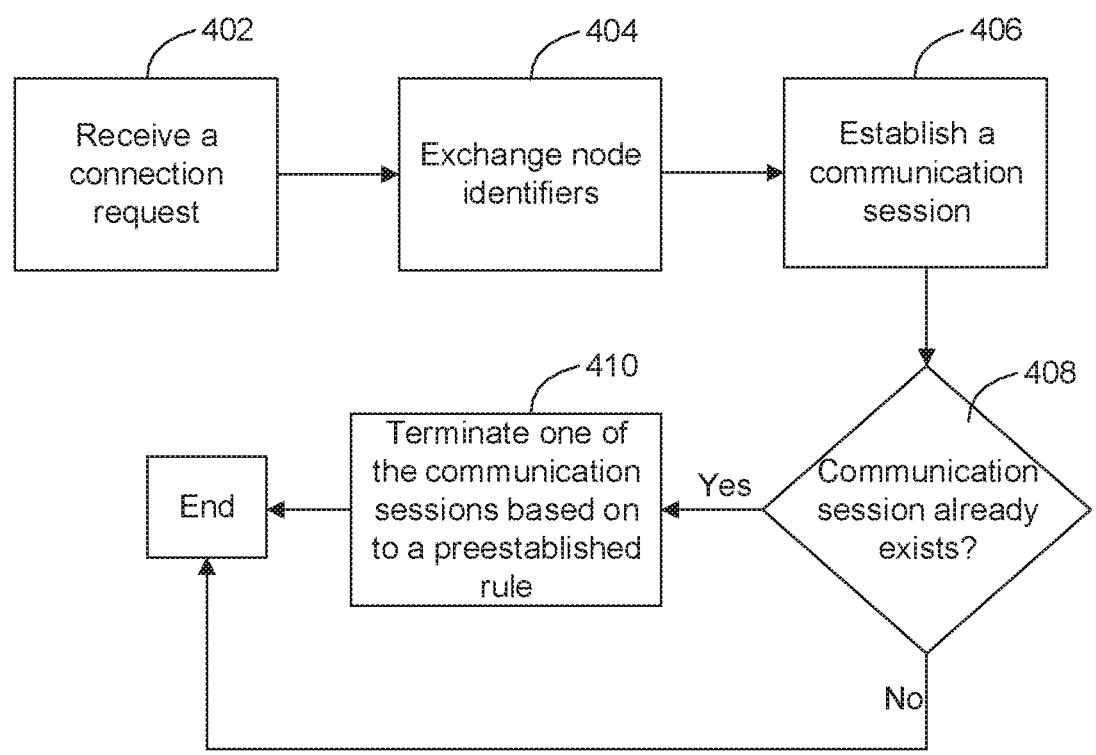
FIG. 4 is a flow chart of a method for establishing communication between first and second nodes in a blockchain system, according to an embodiment.

FIG. 4 is a flow chart of a method 400 for establishing communication between first and second nodes in a blockchain system, according to an embodiment. For example, the blockchain system is implemented in a P2P network including a plurality of nodes. Also, for example, the method 400 may be performed by the node 104 (FIG. 1) as the second node to process the connection request sent by the node 102 (FIG. 1) as the first node.

Referring to FIGS. 1 and 4, at step 402, the node 104 may receive a connection request sent by the node 102. In some embodiments, the node 102 may request to connect with the node 104 at the transport layer level, e.g., request to establish a Transmission Control Protocol (TCP) connection with the node 104. The node 104 may process the request and establish a connection with the node 102 accordingly.

At step 404, the node 104 may exchange node identifiers with the node 102 by providing a node identifier of the node 104 to the node 102 and receiving a node identifier of the node 102 from the node 102. In some embodiments, the node 102 and the node 104 may each sign the exchange using their private keys for security reasons. In some embodiments, however, signing the exchange using private keys may not be necessary, such as when the nodes 102 and 104 are operating in a secured environment, e.g., an isolated testing environment. It is to be understood that while specific implementations may vary, the purpose of this exchange is the same, which is to facilitate exchange of node identifiers in order to cause a communication session to be established on top of the connection between the node 102 and the node 104, at step 406.

At step 408, the node 104 may determine whether another communication session, e.g., a prior communication session different from the communication session just established in step 406, already exists between the node 102 and the node 104. For example, when the node 104 exchanges node identifiers with the node 102, the node 102 may also establish a communication session with the node 104. If the node 104 determines no prior communication session exists between the node 102 and the node 104, the node 104 may terminate execution of the method 400. On the other hand, if the node 104 determines that a prior communication session already exists between the node 102 and the node 104, the node 104 may proceed to step 410 in order to terminate one of the communication sessions based on a preestablished rule. The node 104 may also terminate the connection between the node 102 and the node 104 on which the terminated communication session was established.

In some embodiments, the node 104 is configured to use the same preestablished rule as that used by the node 102 to select which communication session to terminate. For example, if the node 102 is configured to select the communication session that was initiated by the node with the larger node identifier as the session to terminate, the node 104 is configured to use the same rule, which may facilitate terminating the same communication session by the node 102 and the node 104.

As will be appreciated, the above described methods for establishing communication between first and second nodes are based on node identifiers of the first and second nodes. Accordingly, an IP address can be used to support more than one node in the illustrated embodiments. As a result, one computing device can be used to implement more than one node in the illustrated embodiments.

Figure 5:
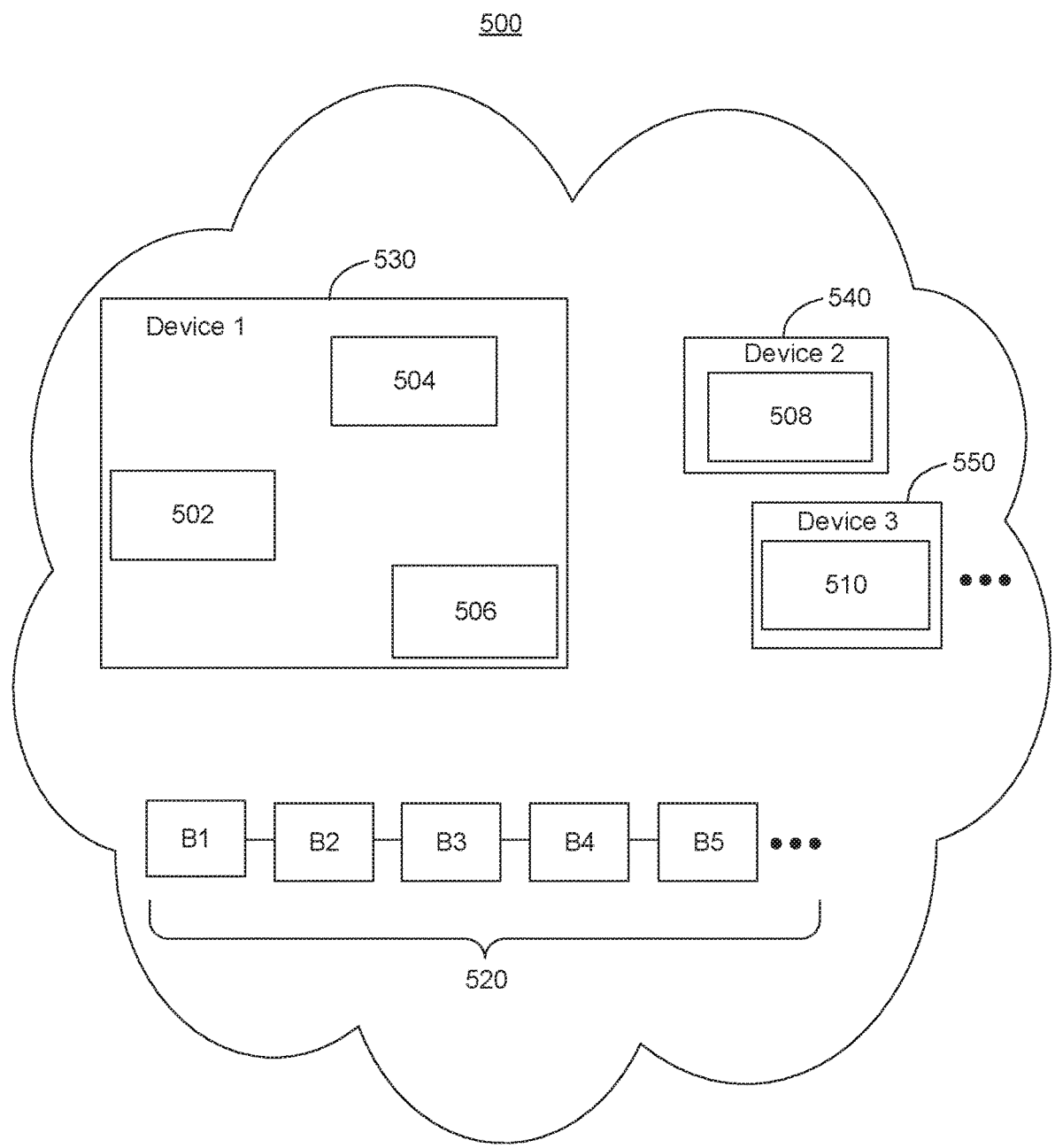
FIG. 5 is a schematic diagram of a blockchain system, according to an embodiment.

FIG. 5 illustrates a schematic diagram of a blockchain system 500, according to an embodiment. Referring to FIG. 5, the blockchain system 500 may include a plurality of nodes 502-510 configured to operate on a blockchain 520, similar to the nodes 102-110 configured to operate on the blockchain 120 (FIG. 1). Furthermore, a computing device 530 is configured to host the nodes 502-506. The computing device 530 may be implemented in a similar manner as the computing device 200 (FIG. 2). That is, the computing device 530 may include a communication interface, a processor, and a memory. In some embodiments, the computing device 530 may implement hypervisors and/or virtual machines to host the nodes 502-506. In some embodiments, the computing device 530 may host nodes 502-506 as processes or applications executing in parallel. The computing device 530 may also use other computing techniques to host the nodes 502-506.

Having the ability to use one computing device to host more than one node may reduce the hardware cost for blockchain systems. These computing devices, however, are not required to host more than one node. As illustrated in FIG. 5, for example, computing devices 540 and 550 may be used to host just one node 508 and 510, respectively, and all nodes 502-510 may operate collectively to operate on the blockchain 520 as described above. Furthermore, it is noted that the methods configured in accordance with embodiments of the specification do not impose any restrictions on which node can initiate a connection request.

The various embodiments presented above are merely exemplary and are not limiting. For example, while the nodes 102 and 104 (FIG. 1) are used to illustrate the executions of the methods 300 (FIG. 3) and 400 (FIG. 4), any node in the blockchain system 100 may use the method 300 to request communication with another node. Similarly, any node in the blockchain system 100 may use the method 400 to process a received connection request.

The methods 300 and 400 may be used in various types of blockchain networks, such as a public blockchain network, a private blockchain network, or a consortium blockchain network, described above. The methods 300 and 400 may also be used for various types of applications, e.g., record keeping, cryptocurrency, blockchain-based distributed ledgers or the like, without departing from the spirit and scope of the specification.

Figure 6:
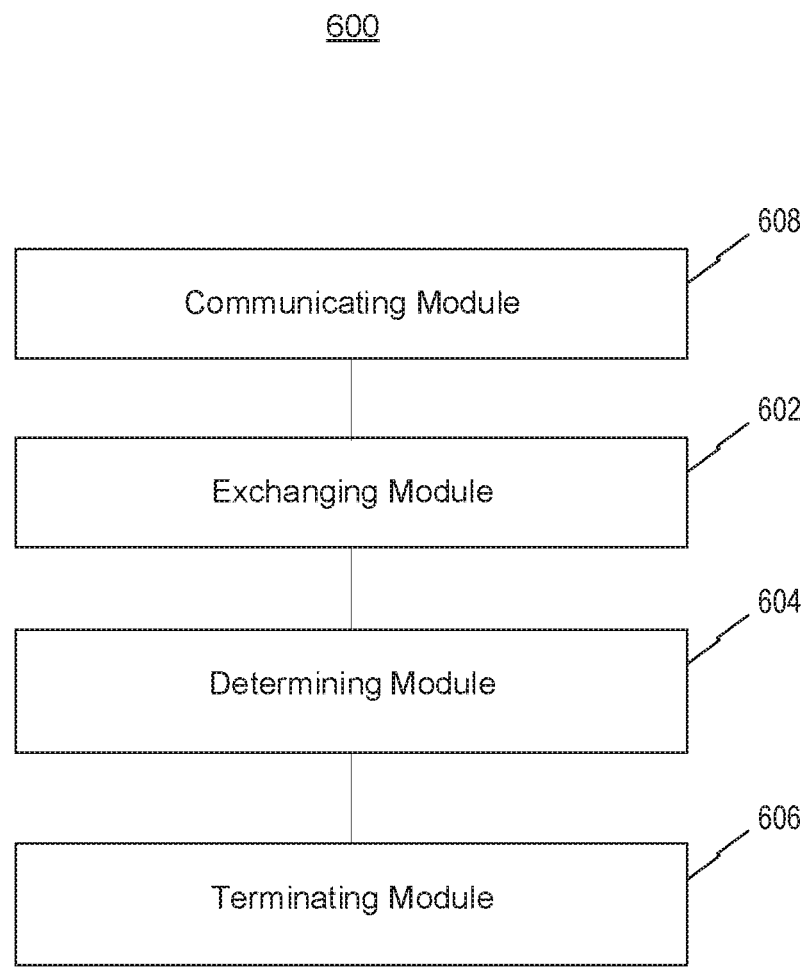
FIG. 6 is a block diagram of an apparatus for establishing communication between first and second nodes in a blockchain system, according an embodiment.

FIG. 6 is a block diagram of an apparatus 600 for establishing communication between first and second nodes in a blockchain system, according to an embodiment. For example, the apparatus 600 may implement each of the first node and the second node. Also, for example, the apparatus 600 may be an implementation of a software process, and may correspond to the method 300 (FIG. 3) or the method 400 (FIG. 4). Referring to FIG. 6, the apparatus 600 may include an exchanging module 602, a determining module 604, and a terminating module 606.

The exchanging module 602 may provide a node identifier of the first node to the second node and receive a node identifier of the second node from the second node, to cause a first communication session to be established between the first node and the second node. The determining module 604 may determine whether a second communication session exists between the first node and the second node. The terminating module 606 may, in response to a determination that the second communication session exists between the first node and the second node, terminate one of the first communication session and the second communication session based on the node identifier of the first node and the node identifier of the second node.

The apparatus 600 may also include a communicating module 608, The communication module 608 may send a connection request to the second node, or receive a connection request from the second node, to establish a connection between the first node and the second node. The communication module 608 may further establish a communication session on top of the connection between the first node and the second node.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods. Further for example, each of the above described modules may be implemented by using a computer chip or an entity, or implemented by using a product having a certain function. In one embodiment, the apparatus 600 may be a computer, and the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each module in the apparatus 600, references can be made to corresponding steps in the above-described methods. Details are omitted here for simplicity.

In some embodiments, a computer program product may include a non-transitory computer-readable storage medium having computer-readable program instructions thereon for causing a processor to carry out the above-described methods.

The computer-readable storage medium may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

It is appreciated that, although terms such as "first" and "second" are used herein for describing various elements, the elements should not be limited by these terms, which are only used for distinguishing the elements. For example, a first element (e.g., a first node) may also be referred to as a second element (e.g., a second node), and similarly, the second element may also be referred to as the first element, without departing from the spirit and scope of the specification.

Although the specification has been described in conjunction with specific embodiments, many alternatives, modifications and variations will be apparent to those skilled in the art. Accordingly, the following claims embrace all such alternatives, modifications and variations that fall within the terms of the claims.

What is claimed is:

1. A computer-implemented method for establishing communication between a first node and a second node in a blockchain system, the method comprising:
   providing, by the first node, a node identifier of the first node to the second node and receiving, by the first node, a node identifier of the second node from the second node, to cause a first communication session to be established between the first node and the second node, the first node and the second node participating in the blockchain system to manage one or more blockchains;
   determining, by the first node, based the node identifier of the second node, whether a second communication session exists between the first node and the second node; and
   in response to a determination that the second communication session exists between the first node and the second node, terminating, by the first node, one of the first communication session and the second communication session based on the node identifier of the first node and the node identifier of the second node, the terminating comprising:
      determining a node by one of: determining a node of the first node and the second node that has a greater node identifier, or determining a node of the first node and the second node that has a smaller node identifier;
      determining a communication session of the first communication session and the second communication session that is established based on a connection request sent from the determined node; and
      selecting the determined communication session of the first communication session and the second communication session for termination.

2. The method of claim 1, further comprising:
   terminating, by the first node, a connection between the first node and the second node, the one of the first communication session and the second communication session being established on the connection.

3. The method of claim 1, before providing, by the first node, a node identifier of the first node to the second node and receiving, by the first node, a node identifier of the second node from the second node, further comprising one of:
   sending, by the first node, a first connection request to the second node to establish a connection between the first node and the second node; or
   receiving, by the first node, a second connection request from the second node to establish the connection between the first node and the second node.

4. The method of claim 3, before the connection is established between the first node and the second node, further comprising:
   determining, by the first node, whether a prior communication session exists between the first node and the second node; and
   in response to a determination that no prior communication session exists between the first node and the second node, sending, by the first node, the first connection request to an Internet Protocol (IP) address associated with the second node to establish the connection between the first node and the second node.

5. The method of claim 3, after the connection is established between the first node and the second node, further comprising:
   determining, by the first node, whether a prior communication session exists between the first node and the second node; and
   in response to a determination that no prior communication session exists between the first node and the second node, performing, by the first node, the providing the node identifier of the first node to the second node and the receiving the node identifier of the second node from the second node.

6. The method of claim 3, wherein a Transmission Control Protocol (TCP) connection is established as the connection between the first node and the second node, the method further comprising:
   establishing the first communication session based on the TCP connection.

7. The method of claim 1, further comprising:
   encrypting, by the first node, the node identifier of the first node using a private key of the first node, before providing the node identifier of the first node to the second node.

8. A computing device for establishing communication between a first node and a second node in a blockchain system, the computing device comprising:
   one or more processors; and
   one or more computer-readable memories coupled to the one or more processors and having instructions stored thereon that are executable by the one or more processors, wherein the one or more processors are configured to:
   provide a node identifier of the first node to the second node and receive a node identifier of the second node from the second node, to cause a first communication session to be established between the first node and the second node, the first node and the second node participating in the blockchain system to manage one or more blockchains;
   determine, based the node identifier of the second node, whether a second communication session exists between the first node and the second node; and
   in response to a determination that the second communication session exists between the first node and the second node, terminate one of the first communication session and the second communication session based on the node identifier of the first node and the node identifier of the second node, wherein in terminating one of the first communication session and the second communication session, the one or more processors are further configured to:

determine a node by one of: determining a node of the first node and the second node that has a greater node identifier, or determining a node of the first node and the second node that has a smaller node identifier;

determine a communication session of the first communication session and the second communication session that is established based on a connection request sent from the determined node; and select the determined communication session of the first communication session and the second communication session for termination.

9. A non-transitory computer-readable medium having stored therein instructions that, when executed by a processor of a computing device, cause the computing device to perform a method for establishing communication between a first node and a second node in a blockchain system, the method comprising:

providing, by the first node, a node identifier of the first node to the second node and receiving, by the first node, a node identifier of the second node from the second node, to cause a first communication session to be established between the first node and the second node, the first node and the second node participating in the blockchain system to manage one or more blockchains;

determining, by the first node, based the node identifier of the second node, whether a second communication session exists between the first node and the second node; and in response to a determination that the second communication session exists between the first node and the second node, terminating, by the first node, one of the first communication session and the second communication session based on the node identifier of the first node and the node identifier of the second node, the terminating comprising:

determining a node by one of: determining a node of the first node and the second node that has a greater node identifier, or determining a node of the first node and the second node that has a smaller node identifier;

determining a communication session of the first communication session and the second communication session that is established based on a connection request sent from the determined node; and selecting the determined communication session of the first communication session and the second communication session for termination.

10. The computing device of claim 8, wherein the one or more processors are further configured to:

terminate a connection between the first node and the second node, the one of the first communication session and the second communication session being established on the connection.

11. The computing device of claim 8, wherein before providing the node identifier of the first node to the second node and receiving the node identifier of the second node from the second node, the one or more processors are further configured to:

send a first connection request to the second node to establish a connection between the first node and the second node; or receive a second connection request from the second node to establish the connection between the first node and the second node.

12. The computing device of claim 11, wherein before the connection is established between the first node and the second node, the one or more processors are further configured to:

determine whether a prior communication session exists between the first node and the second node; and in response to a determination that no prior communication session exists between the first node and the second node, send the first connection request to an Internet Protocol (IP) address associated with the second node to establish the connection between the first node and the second node.

13. The computing device of claim 11, wherein after the connection is established between the first node and the second node, the one or more processors are further configured to:

determine whether a prior communication session exists between the first node and the second node; and in response to a determination that no prior communication session exists between the first node and the second node, provide the node identifier of the first node to the second node and the receive the node identifier of the second node from the second node.

14. The computing device of claim 11, wherein a Transmission Control Protocol (TCP) connection is established as the connection between the first node and the second node, and the one or more processors are further configured to:

establish the first communication session based on the TCP connection.

15. The computing device of claim 8, wherein the one or more processors are further configured to:

encrypt the node identifier of the first node using a private key of the first node, before providing the node identifier of the first node to the second node.

\* \* \* \* \*